3,380,847
THERMALLY STABLE FIBROUS ALKALI
METAL TITANATES
George Leontsacos Lewis, Wilmington, and Hugh C. Gulledge, Newark, Del., and Gunter Teufer, Chadds Ford, Pa., assignors to E. I. du Pont de Nemours and Company, Wilmington, Del., a corporation of Delaware
No Drawing. Filed Nov. 17, 1964, Ser. No. 411,692
16 Claims. (Cl. 117—100)

ABSTRACT OF THE DISCLOSURE

A small amount of a cationic multivalent metal oxide containing compound, particularly an alkaline earth metal compound, such as a meta-, di-, tri- or tetra-titanate of barium or calcium coated on or incorporated within a fibrous alkali metal titanate, particularly fibrous tetra- and hexa-titanate of sodium and potassium, and thereafter heated to 1000° C. or over to improve the dimensional stability of the fibrous metal titanate; preferably the product also bears a coating of an oxide of aluminum, zirconium or titanium.

---

This invention relates to fibrous alkali metal titanates useful as insulating materials, and more particularly to their stabilization in order to impart desired resistivity against extreme, high temperatures which such titanates encounter during use.

Fibrous asbestos-like water-insoluble alkali metal titanates are well known. They correspond to the general formula $M_2O(TiO_2)_n$ wherein M is an alkali metal with an atomic number of at least 11, e.g. potassium, sodium, rubidium and cesium and $n$ can range from 4 to 7, and preferably 6–7. These compounds can be prepared as described in U.S. Patent 2,833,620 by reacting in the presence of water, a water-soluble basic oxygen-containing alkali metal compound, such as sodium or potassium carbonate or hydroxide, with an oxygen-containing titanium compound, such as $TiO_2$, titanyl sulfate or other soluble titanium salt, at a temperature of 400 to 800° C. and under a pressure of at least 200 atmospheres. In the reaction molar ratios of from at least 1:1 to 12:1, and preferably from 3:1 to 8:1, calculated as alkali metal oxide to titanium dioxide, are employed.

More conveniently said titanates, particularly fibrous alkali metal tetratitanates, such as fibrous potassium tetratitanate, can be prepared as disclosed in U.S. Patent 2,841,470 by heating at temperatures ranging up to 1200° C. an alkali metal halide, such as a chloride or fluoride, or mixtures thereof, to molten condition, dissolving in the resulting molten alkali metal halide a compound such as titanium dioxide or an alkali metal titanate having the formula $M_2O(TiO_2)_n$ in which $n$ can range from 2 to 3 and M is an alkali metal having an atomic number of at least 11, maintaining at least a portion of said alkali metal halide saturated with dissolved $TiO_2$ or non-fibrous alkali metal titanate as fibrous alkali metal titanate is formed therein, and separating and recovering the thus formed fibrous, water-insoluble alkali metal titanate product. The ratio of titanium to alkali metal calculated as $TiO_2$ to alkali metal oxide in the charge can range from 1:1 to 12:1 with said ratio preferably being between 2:1 and 8:1. The tetratitanate is generally formed when the ratio of alkali metal oxide to $TiO_2$ is about 1:1 to 1:5 and preferably about 1:4 at temperatures of about 1000° C. When less alkali metal is present, i.e. ratios of 1:6 to 1:8, the hexatitanate forms as the major product particularly if somewhat higher temperatures are resorted to.

Alkali metal titanate fibers exhibit two crystalline structures characteristic of the tetra- and hexatitanates, $$M_2O(TiO_2)_4$$

and $M_2O(TiO_2)_6$, in which M is an alkali metal with atomic number greater than 11. In the manufacture of these products, mole ratios of $M_2O/TiO_2$ ranging from between ¼ and ⅙, as determined by analysis, are usually employed. The physical properties of the fibers will vary, potassium forming a fibrous hexa and tetratitanate and a needle-like prismatic hexatitanate. The tetra- and hexatitanates of both potassium and sodium melt with partial decomposition at temperatures ranging from 1200–1300° C., and potassium tetratitanate undergoes a transition by loss of potassium oxide at a temperature above 800° C. to form the higher density prismatic hexatitanate which is brittle. Sodium titanates, also lose their fibrous characteristics at such temperatures and by a similar process.

Such physical properties as high melting point, high refractive index, high infra red reflectance, extremely low thermal conductivity, etc., render alkali metal titanates in the diameter size range of .5 to 1.5 microns with lengths of .1 to .5 millimeters and longer, especially suitable for use in thermal insulating materials. For example, felted insulating boards with densities of 12–15 lbs./cu. ft., can be readily prepared, while, with pressures up to 70 lbs./cu. ft. even higher density blocks can be produced. Desirably, the articles of commerce produced from fibrous alkali metal titanates should possess chemical and thermal stability. In insulating applications it is mandatory that the board or structure be dimensionally stable, especially thickness so that undesired shrinkage and deterioration will be avoided.

It has been found in practice however, that objectionable shrinkage with weakening and deterioration of the insulating structure does occur and that this shrinkage can amount to as much as 35% upon exposure of the articles for 20 hours at a temperature of 1150° C.

It has now been found that such undesired thermal and chemical instability of prior fibrous alkali metal titanates when exposed to adverse thermal and other conditions of use can be effectively remedied. It is among the objects of this invention therefore to provide novel and effective means for accomplishing this object and for imparting desired stability in said titanates. It is among the particular objects of the invention to provide a novel, high temperature resistant fibrous alkali metal titanate insulating composition advantageously stabilized against undesired shrinkage and which remains dimensionally stabilized as a thermal insulating material upon prolonged exposure to temperatures ranging from 800–1200° C. A specific object is to provide novel methods and means for producing a high temperature stabilized insulating material composed essentially of fibrous alkali metal titanate, and particularly of fibrous potassium or sodium titanate. Other objects and advantages will be apparent from the following description of the invention.

These objects are attainable in this invention which embodies the discovery that objectionable thermal and chemical instability encountered in utilizing fibrous alkali metal titanates, particularly fibrous tetra- and hexatitanates of sodium and potassium, can be remedied and that the dimensional stability of said titanates can be advantageously enhanced, by coating, incorporating or otherwise intimately associating with the titanate prior to use and subjection to temperatures above 1000° C., a small amount of a cationic multivalent metal oxide containing compound, particularly an alkaline earth metal compound, such as a meta-, di-, tri- or tetra-titanate of barium or calcium. Usually, the use and presence in the fibrous material of about 0.5 to 10%, by weight, of such metal oxide compound or mixtures thereof, in the form of a titanate, vanadate, silicate, molybdate, zirconate, niobate, aluminate or tungstate, in the final product effectively imparts the desired improvement and stability. Amounts of alkaline earth metal compounds ranging from about 2-6%, by weight, calculated as the alkaline earth metal oxide, are particularly preferred for employment.

In effecting the alkaline earth metal titanate or other treatments herein contemplated recourse can be resorted to several types of procedures, including (1) mechanical wet or dry mixing of the fibrous titanate with the desired amount of alkaline earth metal titanate; (2) admixing an aqueous slurry of the fibrous titanate with a solution or slurry containing the desired quantity of alkaline earth metal titanate; or, preferably, (3) co-producing the alkaline earth metal titanate during formation of the fibrous alkali metal titanate whereby the alkaline earth oxide source is incorporated into the fibrous alkali metal titanate reaction mixture.

Advantageously by coating the fibrous titanate with or incorporating therein an amount of alkaline earth metal titanate such that the resulting composite on analysis for the alkaline earth oxide present amounts to no greater than 10%, by weight, it will be found that the dimensional shrinkage of insulation blocks or boards constructed from the treated fibrous material will amount to less than a tolerable 3-5% at temperatures as high as 1100-1150° C. upon exposure of the treated fibrous material for a short period of time—20 hours or so. Advantageously, superior thermal stability and strength characteristics will be found to accrue upon coating the multivalent metal stabilized titanates of this invention with oxides of aluminum, zirconium and titanium. The addition of these materials to barium or calcium stabilized fibrous potassium titanates, for example, will enable one to subject the insulating boards to heating to temperatures of about 1150°-1200° C. for periods of 100 hours and more without encountering a shrinkage greater than 5%. The additional heat resistance thereby afforded is apparently due to reinforcement of the felted products, either by random cross bonding, with a more refractory material throughout the structure, or by forming a brush heap structure of larger or stiffer fibers which prevent collapse or shrinkage of the felt.

To a clearer understanding of the invention the following specific examples are given wherein parts mentioned are by weight. These are merely illustrative and are not to be considered as in limitation of the underlying principles of the invention.

Example I

Stabilized potassium titanate fibers were prepared by a coproduction technique in which a mixture containing 32% $TiO_2$, 17% anhydrous powdered $K_2CO_3$, 1% powdered $Ba(OH)_2$ and 50% crystalline KCl fine was twice micropulverized and then blended in a drum mixer at a rate of 32 r.p.m. for a period of 4 days. Thereafter, distilled water mist was sprayed into the drum roller until an increase in 5% by weight was realized. The resulting mixture was then compressed into pellets of approximately 25 grams in weight and 1.4" diameter under 200 lbs. gauge pressure. A 575 gram portion of this pelletized mix was heated for 4 hrs. at 1000°±25° C. in a muffle furnace. After the calcination the pellets were quenched in 500 mls. of distilled water and permitted to soak for 12 hours. The pellets were then crushed in a mortar to pass through a 6 mesh screen and the screened, crushed lumps were stirred for 5 minutes in 2,800 mls. distilled water, and were then given a one pass treatment through a conventional colloid mill with a close setting. The mill was washed with distilled water and the washings added to the resulting dispersion to provide a final volume of 5,600 mls. The pH of the dispersion was 12.2. The fibrous slurry was then adjusted to a pH of 9.1 by the addition of 340 mls. of 1 N HCl during 15 minutes. The material was then filtered on a 10" Buchner funnel and washed with distilled water until the wash water gave a negative test for chlorides. The filtered cake obtained was combined with two other similar portions, prepared as above, and dispersed with a propeller stirrer in 15,500 mls. distilled water for 10 minutes. A felted pad was formed from the dispersion by collecting the fibers on a 120 mesh screen in a 12" x 12" filter box under evacuation and drying at 130° C. The weight of the dry pad was 548 grams.

This block of BaO treated insulation material was then employed and tested as shown in Table I below and gave the improved properties as shown in (A) under said table. Two additional insulation blocks (B and C) shown in said table, were prepared in similar fashion from mixtures containing 30% $TiO_2$, 16% anhydrous $K_2CO_3$, 3% powdered $Ba(OH)_2$ and 50% KCl and a mixture containing 31% $TiO_2$, 17% $K_2CO_3$, 2% $BaOH_2$ and 50% crystalline KCl, and were found to give similarly improved shrink properties as set out in the table.

The results of the tests on these three BaO treated insulating blocks are compared as shown in the table with an unmodified fibrous potassium titanate as a control, made in similar fashion but with no barium oxide being present in the reaction mixture. The shrink test was conducted by total immersion of each product in a furnace heated to a temperature of 2,100° F.±10° F., with shrinkage being calculated by making measurements of each block tested.

TABLE I

| Example I | Calciner Feed Mix $K_2O/BaO$ Molal Ratio | Analysis, Finished Sample [1] | | | | Density, lbs./cu. ft. | Total Immersion Heat Soak Test, Percent Shrinkage in Thickness After 20 hrs. at 2100° F. |
|---|---|---|---|---|---|---|---|
| | | Percent | | | $K_2O/BaO$ Mol. Ratio | | |
| | | $TiO_2$ | $K_2O$ | BaO | | | |
| A | 19.2 | 82.04 | 15.02 | 2.83 | 8.7 | 15.0 | 4.8 |
| B | 9.1 | 80.69 | 14.25 | 5.27 | 4.37 | 13.6 | 3.0 |
| C | 5.66 | 79.98 | 12.83 | 6.44 | 3.24 | 16.5 | 3.4 |
| Unmodified Control | No barium | 84.42 | 15.27 | 0 | | 16.7 | 31.0 |

[1] Samples heated 3 hrs. at 600° C. for analysis.

Example II

A mixture containing one part powdered barium hydroxide, 15 parts anhydrous powdered potassium carbonate, 30 parts anatase pigment grade $TiO_2$ and 45 parts granulated potassium chloride was dry blended with a conventional blade type mixer at a rate of 2 hours/160 lbs. batch. This material was then pressed into cylindrical briquettes of approximately ¾" x 1" in size which were then continuously fed, at rates 30 lbs. per hour, into a gas fired rotary ceramic lined kiln with an 18" internal diameter and 30 ft. in length, heated by direct gas firing at the opposite end. The bed temperature within the kiln was adjusted to a temperature ranging from 520° C. at the feed port to 1010° C. at the furnace exit, with approximately a continuous increase in temperature existing over the 30 ft. length. Residence time of the reactants in the kiln was regulated at 6 hours and was maintained by adjusting the pitch of the rotary speed of the kiln. A uniform bed depth was maintained within the kiln with a holdup anywhere between 150 lbs. to 450 lbs. of feed material and about 11.5 lbs. of fibrous potassium tetratitanate was produced each hour. The calcined briquettes containing the fibrous material were quenched on discharge from the kiln in a 1000 gallon tank and purged at 90° C. with demineralized water, timed at 3 gallons per hour for 6 days. The slurry contained 6–8% solids.

Insulation size fibers thus obtained were exfoliated by wet grinding the material in demineralized water to form a 5% fiber slurry. This slurry was then passed through an attrition mill set at 3 mils and the slurry diluted to 3½% fiber content with the demineralized water. The resulting mixture was passed through a cleaner consisting essentially of a wet cyclone separator to remove large particles of grit. Finally, the exfoliated slurry was reprocessed and the resulting dispersion was then pumped into a 3000 gallon vessel and allowed to settle for 2 hours. To the slurry was then added sufficient alum and sulfuric acid in 1:1 proportions until the pH of the slurry was adjusted to 9.5. The mixture obtained was then passed into a filter press and washed for 15 minutes with demineralized water. The filter press cake was dried at 140° C. for about 16 hours then repulped at a 3½% fiber concentration in process water, and the material obtained was felted into 1″ thick boards of 12″ squares which were shrink tested in the following manner:

The boards were totally immersed in a furnace heated at 1100° C. and 1150° C. and held therein for periods of from 20 to 100 hrs. Subsequent examination of each revealed that in no instance did any board shrink over 5% in thickness. Prior to such shrinkage tests, the bulk fibers analyzed 3% $H_2O$, 80% $TiO_2$, 15% $K_2O$ and 2% BaO on the average. In a comparable test applied against felted boards of substantially the same composition but prepared from an untreated, alkaline earth oxide-free fibrous potassium titanate, board shrinkages in excess of 20% were obtained in every instance.

Example III

Employing the equipment described in Example II the following mix which was blended 60 hrs. in the blender and then pelletized for calcination.

| Mix: | Lbs. |
|---|---|
| $TiO_2$ (anatase pigment) | 400 |
| Anhydrous $K_2CO_3$ | 260 |
| Fine granulated KCl | 600 |

The pellets were calcined at 950° C. in a rotary calciner with average hold time at temperature of approximately 3 hrs. The calcined pellets were loaded in a cylindrical tank and washed by gravity flow with softened water until the molar ratio of $TiO_2$ to $K_2O$ in the produce was approximately 5. The leached lumps were exfoliated with suitable stirring in demineralized water at final concentration of 3.5% solids. The pH was adjusted with 1.0 N $H_2SO_4$ to 9.3. The pulp was filtered and dried. Chemical analysis of the dried pulp (analytical sample dried 3 hrs. at 600° C.): $K_2SO_4$, .1%; $TiO_2$, 84.0%; $K_2O$, 15.04%; $TiO_2/K_2O$, 6.6. The resulting fibrous potassium titanate product then was treated, step-wise as follows:

(1) 745 g. of dry pulp was dispersed in 20 liters of distilled water with a propeller stirrer.

(2) 23 cc. of 200 g./l. $Al_2(SO_4)_3 \cdot 18H_2O$ solution was added to the dispersion to provide a pH of 9.6, and the addition of the alum solution was continued as 100 g./l. KOH solution was added simultaneously to maintain the pH of the dispersion at 9.6. The total alum solution added was 1042 cc. (4% $Al_2O_3$ on product), the total KOH solution added was 1145 cc., and the total time for effecting the additions was 15 min.

(3) The resulting dispersion was stirred for 5 minutes and then filtered on a 120-mesh screen in a 12″ x 12″ box with vacuum.

(4) The wet cake was dispersed in 18,000 cc. distilled water with propeller stirrer during 10 minutes. The pH of the final dispersion was 9.4.

(5) A block was formed by vacuum filtration on the 120-mesh screen and dried at 130° C.

The finished block material exhibited improved heat resistance, better flexural strength, and better thermal conductivity than the untreated fibrous titanate material, as shown in Table 2 below.

Example IV 1500 g. of the barium-modified calcined fibrous potassium titanate pellets prepared as described in Example II were softened by soaking overnight in 2000 cc. distilled water. The softened pellets were then crushed to pass through a 6-mesh screen and dispersed in 17,000 cc. distilled water with one pass through a conventional type colloid mill. The pH of the resulting dispersion was 12.25.

396 cc. of 200 g./l. $Al_2(SO_4)_3 \cdot 18H_2O$ solution was then added over a 15 minute period to the dispersion to provide a pH of 10.1, after which 1186 cc. of 0.5 N HCl was added during a 15 min. period to give a pH of 8.8. The dispersion was filtered on 120-mesh screen and washed with distilled water until the filtrate was free of chlorides. The washed filter cake was dried at 130° C., dry wt.=634 g.

570 g. of the dried, washed material thus obtained was dispersed in 16 liters of distilled water with propeller stirrer and stirred slowly for 1½ hours. 31 g. of a commercial polyvinyl acetate emulsion (55% solids) dispersed in 300 cc. distilled water, was then added, with stirring being continued for an additional 10 min. The resulting product was then formed into an insulating block, approximately 12″ x 12″ x 1″, by vacuum filtration on a 120-mesh screen and was dried at 130° C.

Table 2 below shows the superior heat resistance properties of this material in comparison with an untreated fibrous potassium titanate product.

Example V (1) 206 g. of wet untreated leached lumps (prepared as in Example III) was crushed through 6-mesh screen and dispersed in 2.5 liter of distilled water by one pass through a colloid mill. The dispersion was allowed to settle for 5 min. and then decanted to remove unexfoliated material.

(2) 10 cc. of 100 g./l. KOH solution was added to the dispersion to give pH=11.5.

(3) 13.5 cc. of a $TiCl_4$ solution (100 g./l. $TiO_2$) was then added to give pH=8.2.

(4) $TiCl_4$ addition was continued as 100 g./l. KOH solution was added simultaneously to hold the pH of the dispersion at 8.2. The total $TiCl_4$ solution added was 45 cc. (5.07% $TiO_2$ on product), the total KOH added was 59 cc., and the time of addition was 15 min.

(5) The material was filtered on a Buchner funnel, was washed with 1000 cc. distilled water, and then redispersed in 2000 cc. distilled water with a propeller stirrer.

(6) A finished block was pulled on the Buchner funnel, and was dried at 130° C.

Table 2 below shows the improved heat shrinkage properties of this fibrous titanate material in comparison with those exhibited by the untreated fibrous potassium material prepared for treatment in Example III.

Example VI

A fibrous potassium titanate material was prepared as in Step 1 of Example V. 20 cc. of 100 g./l. KOH solution was added to the resulting dispersion to provide a pH of 12.02. 105 cc. of a $ZrCl_4$ solution (53 g./l. $ZrO_2$) was then added during a 15 min. period to give a pH of 8.2. This addition was equivalent to 6.3% $ZrO_2$ on product. The material was then filtered on a Buchner funnel and washed with 1000 cc. distilled water. Thereafter the washed material was dispersed in 2000 cc.

distilled water with a propeller stirrer and a finished block was pulled on a Buchner funnel and dried at 130° C. The improved heat shrinkage characteristics of this fibrous potassium titanate material compared to those of the untreated material shown in Example III are shown in Table 2 below.

Example VII (1) 170 g. of the barium-modified potassium titanate calcined pellets, prepared as described in Example II, were soaked overnight in 250 cc. distilled water to effect softening.

(2) The softened pellets were crushed to pass through a 6-mesh screen and then dispersed in 1600 cc. distilled water with one pass through a colloid mill. The pH of the resulting dispersion was 12.2.

(3) 21.2 cc. of 200 g./l. $Al_2(SO_4)_3 \cdot 18H_2O$ solution plus 12.3 cc. of 100 g./l. $ZrCl_2$ solution were thoroughly mixed, then added during a 15 minute period to the dispersion obtained from Step 2 to give a pH of 10.3.

(4) 148 cc. of 0.5 N HCl was then added during 15 minutes to give pH 8.8.

(5) The resulting dispersion was filtered on a 120-mesh screen, washed on the screen with distilled water until the filtrate gave a negative test for chlorides and sulfates, and the washed material was dried at 130° C. (dry wt.: 71.87 g.).

(6) The dry pad was dispersed in 1750 cc. distilled water with a propeller stirrer and the dispersion was stirred slowly for 1 hr., then filtered on a 120-mesh screen, and then dried at 130° C. (dry wt. was 70.50 g.). Table 2 below shows the superior heat resistance properties of this material in comparison with an untreated fibrous titanate product.

Example VIII (1) 80 g. of untreated dry pulp prepared as in Example III was dispersed in 600 cc. distilled water with one pass through a colloid mill.

(2) 76 g. of unbleached kraft pulp dispersion (3.17% solids, freeness 13) was added.

(3) Alcoa No. 666 aluminum flakes (99.5% through 8-mesh, 65% on 20-mesh) was degreased by washing in a 2% solution of $Na_2SiO_3 \cdot 5H_2O$, rinsing with distilled water and drying. 6.8 g. of the cleaned aluminum flakes were added to the fibrous potassium titanate dispersion. After stirring 10 minutes, the mixture was formed into a pad by filtering on a 120-mesh screen. The improved heat resistance of this fibrous titanate material is shown in Table 2 below.

Example IX (1) 3000 cc. of a barium-modified potassium hexatitanate dispersion containing the equivalent of 110 g. of fibers prepared in accordance with the procedures described in the first paragraph of Example IV, was treated with 0.5 N HCl to give pH 9.1 during a period of 15 minutes.

(2) The material was then filtered on a 10" Buchner funnel fitted with a 120-mesh screen, and washed with distilled water until the filtrate was free of chlorides.

(3) The wet pulp was dispersed in 750 cc. distilled water with a propeller stirrer, and stirred slowly for 1 hr.

(4) 83 g. of unbleached kraft pulp dispersion (3.98% solids, freeness 13) was added.

(5) 6 g. of a commercial polyvinyl acetate emulsion (55% solids) was added.

(6) 4.4 g. of aluminum flakes treated with sodium silicate as used in Example VIII, step 3, was added, and the dispersion stirred for 10 min.

(7) The mixture was formed into a pad by filtering on a 120-mesh screen in a 6" Buchner funnel.

Table 2 below shows the superior heat resistance characteristics of this material over an untreated fibrous titanate.

Example X (1) 93 g. of untreated dry pulp prepared as in Example III was dispersed with a propeller stirrer in 2800 cc. distilled water.

(2) 10 g. of commercial aluminum silicate fibers were then incorporated in the dispersion, using fast stirring for a 5 min. period.

(3) The resulting dispersion was stirred for an additional 10 minutes and then filtered on a 120-mesh screen.

Table 3 below demonstrates the improvement in density and heat resistance properties exhibited by this material in comparison with unreinforced fibers.

TABLE 2.—REINFORCED FIBROUS TITANATE

| Example | Reinforcing Materials Percent Added | | | | | Block Density, #/cu. ft. | Flexural Break, p.s.i. | Heat Soak Test, 2,100° F.—Shrinkage, Percent | | | |
|---|---|---|---|---|---|---|---|---|---|---|---|
| | | | | | | | | 20 Hours | | 92 Hours | |
| | $Al_2O_3$ | $TiO_2$ | $ZrO_2$ | Aluminum | Fiberfrax | | | Thick. | Av. L.W.T.[1] | Thick. | Av. L.W.T.[1] |
| III, Untreated | | | | | | 21.2 | 34.6 | 27.2 | 14.9 | | |
| III, Coated | 4.0 | | | | | 23.2 | 69.8 | 13.8 | 3.9 | | |
| IV | 1.92 | | | | | 15.9 | 38.2 | .7 | .4 | 3.5 | 2.8 |
| V | | 5.07 | | | | 18.7 | 42.0 | | | | |
| VI | | | 6.3 | | | 18.4 | 20.0 | | | | |
| IV and VI Untreated | | | | | | 19.0 | 18.0 | | | | |
| VII | 1.0 | | 1.0 | | | 15.2 | 13.9 | 0 | 0 | 1.8 | 1.5 |
| VIII | | | | 8.0 | | 23.5 | 23.3 | 7.7 | 5.0 | | |
| IX | | | | 4.0 | | 14.4 | 24.9 | 3.2 | 1.9 | 3.3 | 3.1 |
| X | | | | | 10 | 15.4 | 20.0 | 11.7 | 4.5 | | |
| Barium-Modified Control (Ex. VII–X) | | | | | | 15.0 | 25.3 | 4.8 | 3.0 | 15.1 | 8.1 |

| Example | Heat Soak Test, 2,040° F.—Shrinkage, Percent, 20 Hours | | Analysis After 3 Hrs. at 600° C. | | | | | | |
|---|---|---|---|---|---|---|---|---|---|
| | Thick. | Av. L.W.T.[1] | $TiO_2$, Percent | $K_2O$, Percent | BaO, Percent | $TiO_2$/Alkali Molar Ratio | $Al_2O_3$ Percent | $ZrO_2$ Percent | Al Percent |
| III, Untreated | | | 83.39 | 15.50 | | 6.34 | | | |
| III, Coated | | | 80.51 | 14.44 | | 6.55 | 3.87 | | |
| IV | | | 80.24 | 16.39 | 2.26 | 5.30 | .87 | | |
| V | | | 86.90 | 13.48 | | 7.6 | | | |
| VI | | | 77.06 | 15.18 | | 5.98 | | 6.3 | |
| IV and VI Untreated | 14.9 | 6.9 | 81.66 | 17.04 | | 5.67 | | | |
| VII | 4.4 | 1.3 | 78.92 | 17.10 | 2.14 | 5.03 | .70 | .90 | |
| VIII | 33.9 | 11.8 | 75.33 | 14.01 | | 6.32 | | | 9.13 |
| IX | | | 77.08 | 15.96 | 1.88 | 5.28 | | | 4.17 |
| X | | | 77.93 | 13.11 | | 6.98 | | | |
| Barium-Modified Control (Ex. VII–X) | | | 82.04 | 15.02 | 2.83 | 5.8 | | | |

[1] Length-width-thickness.

The stabilization which this invention provides appears to take place by an ion exchange process at the fiber surface at temperatures in the range of 800–1000° C. since decomposition, in the instance of potassium tetratitanate, takes place in accordance with the following reaction:

(1)
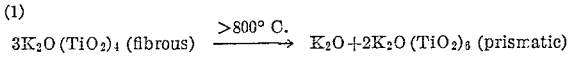
$$3K_2O(TiO_2)_4 \text{ (fibrous)} \xrightarrow{>800°\,C.} K_2O + 2K_2O(TiO_2)_3 \text{ (prismatic)}$$

The stability of the treated titanate fibers is attributed, in the case of barium oxide treatment, to the substitution of the divalent barium ion for potassium ion on the surface of the fiber. Stability will be found to vary with the concentration of the divalent metal ions present and the degree of substitution effected. Substitution takes place, it is believed, in accordance with the following reaction:

(2)
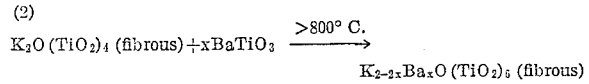
$$K_2O(TiO_2)_4 \text{ (fibrous)} + xBaTiO_3 \xrightarrow{>800°\,C.} K_{2-2x}Ba_xO(TiO_2)_5 \text{ (fibrous)}$$

If desired, the concentration of divalent metal ion present in the treated fiber can be higher than the 10%, calculated as alkaline earth metal oxide, already mentioned. However, the use of such higher amounts is not recommended since it may cause the fiber to become brittle and lose strength. Divalent barium, with an ionic radius of 1.35 A., can be substituted for potassium ions (ionic radius 1.33 A.) in the crystal structure without distorting the crystal lattice and destruction of the fibrous nature of the product. Similarly, multivalent cations with ionic radii of 1.3 A.±.2 A. can suitably stabilize the lattice, while multivalent cations of ionic radii of 0.95 A.±.2 A. can stabilize sodium hexatitanate fibers by a similar mechanism.

In addition to the advantageous stabilization of the titanate fibers at relatively high temperatures which the invention affords, the treatments contemplated herein also enhance the chemical stability of said fibers in acid solution. For example, a 1% slurry of unmodified potassium tetratitanate has a pH of 10.5. Upon the addition of 6 ml. of 0.1 N HCl to the slurry a pH of 8 results. A similar slurry but containing potassium tetratitanate treated to contain 7.8% BaO after addition of 6 ml. of .1 N HCl will have a pH of 6 in contrast to said 8 pH for unmodified potassium tetratitanate. This is clearly indicative of the blocking of easily removed potassium ions. This chemical stability is especially advantageous for paper industry applications wherein stability of the titanate in acid alum slurries is highly important.

A further advantage afforded by the invention is the higher resistance to degradation which a barium or other alkaline earth modified fibrous alkali metal titanate will exhibit on subjecting normal refractory materials such as insulating fiber to relatively high temperatures. This is readily illustrated by the following comparative tests: A block of standard, unmodified potassium tetratitanate insulation material and a block of barium modified material prepared as in Example I were placed on a commercially available insulating firebrick and heated in a furnace at 1100° C. for 327 hrs. The depth of decomposition of the surface in contact with the firebrick was found to be 0.23″ for the unmodified titanate block whereas the depth of decomposition of the barium modified material was 0.08″ or approximately ⅓ the amount of degradation encountered with the unmodified material.

While described as applied to certain specific embodiments the invention obviously is not limited thereto and variance therefrom is contemplated without departing from its principles and scope. Thus, although particularly directed to the treatment of insulating useful forms of fibrous alkali metal titanates having a particle diameter ranging from 0.6–3.0 microns and lengths of from 100–1000 times their diameter, or longer, the invention is applicable to the treatment of all types of alkali metal titanates including pigmentary types thereof having diameters ranging from 0.1 to 0.6 micron with lengths ranging from 10 to 100 times their diameter. As already noted insulation grade fibers can be obtained by calcining for periods of from .25 to 16 hours, and preferably from about 1–6 hours in a rotary kiln, shaft or muffle furnace, at temperatures of 975–1150° C., mixtures containing an alkali metal oxide source, such as sodium or potassium hydroxides or carbonate, and titanium dioxide or other $TiO_2$ source, in the equivalent molar ratio of $TiO_2/M_2O$, wherein M is preferably K or Na, being between 2:1 and 8:1 and preferably 3:1 and 5:1. The mixture can also contain, if desired, a halide salt of sodium or potassium preferably the chloride, and in concentrations of 5–65%, by weight. In preparation of fibrous products predominantly in pigmentary size range, temperatures ranging from about 850–975° C. are resorted to.

While barium and calcium titanate comprise preferred multivalent cation-containing compounds as useful treating agents in the invention to impart desired chemical and thermal stability to a fibrous alkali metal titanate, use is generally contemplated of multivalent metal oxygen-containing inorganic salts selected from titanates, vanadates, silicates, molybdate, zirconates, niobates, alumnates and tungstates, or mixtures thereof, which in the case of potassium titanate treatment have a multivalent metal cation of ionic radii within 1.33 A.±.2 A., i.e. barium, strontium, lanthanum, indium, thallium, bismuth, and, in the case of fibrous sodium titanate treatment, have a multivalent metal cation of ionic radii of 0.95 A.±.2 A., i.e. sodium, calcium, yttrium, cadmium, thallium, germanium, lead, mercury, zirconium, hafnium, indium, and copper. Preferably use is made of oxygen-containing inorganic compounds of multivalent metal cations, or their mixtures, adapted to decompose at temperatures of 800–1100° C. to form the desired stabilizing multivalent metal titanate, vanadate, zirconate, silicate, niobate, tungstate or molybdate in situ of the fibrous alkalate metal titanate, with the volatile reaction by-product formed being immediately expelled. Included among suitable sources of decomposable multivalent metal oxygen-containing compounds, the various oxides, hydroxides, carbonates, nitrates, oxylates, etc. of the multivalent metals mentioned can be employed of which compounds the oxides particularly of barium and calcium are preferred for use.

Intimate association of the stabilizing oxygen-containing compound with the fibrous alkali metal titanate can be brought about through direct mixing of the compound with the titanate or by co-producing each as shown in the above examples. Thus the treating agent can be incorporated in or otherwise applied to the fibrous titanate by mixing the fiber with solutions or slurries of the multivalent cation compound which absorb on the fiber surface prior to filtration and drying. If desired, the finely divided stabilizing agent can be dry mixed with the fiber through tumbling of the mixture in a drum mixer until the fiber becomes desirably coated with such agent. A simpler, more economical and preferred method for effecting such association can be obtained by adding the desired quantity of metal oxide treating agent to the reaction mixture during formation of the fiber. Thus, the stabilizing agents can be co-formed in the reaction mixture by adding the multivalent metal oxide source, preferably as, calcium oxide, in the case of sodium titanate fibers, and barium oxide in the case of potassium titanate, under the conditions above described. Calcium and barium metatitanates become dispersed within the fibrous kiln discharge. Multivalent metal oxide equivalents should be added to the reaction mixture such that 0.5 to 10% by weight will be present in the improved fiber. In the case of barium oxide use, optimum results are obtained when the final product contains 2.0–6% barium oxide. Another preferred procedure to obtain a high temperature, dimensionally stabilized potassium titanate fiber comprises calcining a pelletized intimate mixture of $TiO_2$, $K_2CO_3$, $Ba(OH)_2$ and KCl at temperatures of 975–

1050° C. for a period of from 1–6 hours in a directly fired rotary kiln. Hot kiln discharge, in the form of calcined pellets, are then quenched in water to remove solubles and effect dispersion of the fibers. Following dissolution of all chloride solubles present, the fibrous containing slurry is neutralized with a mineral acid, filtered, washed until essentially chloride free and is then dried.

While the fibrous titanate can be suitably coated with a multivalent metal titanate or oxygen-containing inorganic compound by means of direct mixing or co-production, the fibrous titanate can be treated with a salt solution of a suitable multivalent compound, such as barium or calcium chlorides, nitrates, hydroxides, carbonates, etc. For example, a solution of barium chloride can be employed to obtain potassium tetratitanate containing from 0.4 to 8% BaO which will remain desirably stabilized when subjected to a temperature of 1150° C. for long periods of time. The stabilizing barium titanate is first formed upon heating of the fibrous tetratitanate in excess of 1000° C. to provide a composition containing multivalent metal (e.g. Ba) ions within the crystal lattice of the fibrous material in place of alkali metal (e.g. K) ions.

Either the unaltered or stabilized fibrous sodium or potassium titanates can be improved by treatment with alumina, zirconium or titania. Fibrous material can be treated with the oxides by mixing them with easily oxidizable substances to yield their oxides. For example metal, powder, wire screens, etc. or flakes, of Al, Zr, Ti can be physically incorporated into the felt or insulation board then subjected to an oxygen atmosphere at high temperatures. The preferable aluminum flakes which are essentially uniformly dispersed throughout the felt are oxidized at temperatures above 500° C. The alkalinity of the titanate fibers in contact with the flakes catalyze the oxidation and forms potassium aluminate bonds between fibers and the alumina coating. Highly refractory bonded alumina sites throughout the insulation board greatly improve the stability of the structure at high temperatures.

Hydrous metal oxides of Al, Zr, Ti can be used to obtain similar results. Compounds which yield hydrous metal oxides of these metals in an aqueous slurry of the fibrous titanates either treated or untreated will be strengthened and stabilized after the slurry is felted or boarded and heat treated. The effectiveness of the hydrous metal oxides depends upon cross bonding at random points throughout the structure. The hydrous oxides also improve the insulating value of the fiber boards by decreasing the pore size in the structure.

Preferably hydrous oxides are applied by raising the pH of a salt of Al, Ti or Zr which upon basic hydrolysis yields a hydrous oxide. Sulfates, halides, nitrates and other salts containing anions which form water soluble salts and the hydrous oxides upon the additions of base are contemplated as useful in this invention. In particular, alum, aluminum chlorides, titanic acid, titanyl chloride and sulfate, and zirconyl sulfate and chlorides are preferred for use. When the multivalent cation treatment is added as the aluminate or zirconate, the amounts of these metal oxides can be reduced to produce effective stability.

The amount of Al, Ti and Zr oxide and metal powders etc. incorporated with the insulating titanates fibrous felts and boards is variable and can range from between 0.5 and 25% by weight of the final product. However, the useful limits for each oxide will be found to differ slightly, as shown in the following table.

TABLE 3

| Reinforcing Oxide | Operable Limit, percent by wt. of product | Preferred Limit, percent by wt. of product |
| --- | --- | --- |
| Hydrous Alumina as $Al_2O_3$ | .5–10 | 1.5–6 |
| Hydrous Titania as $TiO_2$ | .5–10 | 2.0–6 |
| Hydrous Zirconia as $ZrO_2$ | .5–15 | 2.0–6 |
| Aluminum Metal as Al | .5–25 | 2.0–16 |
| 50% $Al_2O_3$+$TiO_2$ mixture | 1–10 | 2–6 |
| 50% $Al_2O_3$+$ZrO_2$ mixture | 1–12 | 2–8 |

As noted, the limits for the various reinforcing materials employed herein are shown as percent by weight in finished product.

For optimum results, the $TiO_2/K_2O$ molar ratio of the finished block should be 6±1, or preferably 6±.5, although the reinforcing materials are effective in improving heat stability of fibrous potassium titanate which has a much wider range of $TiO_2/K_2O$ molar ratio. Leaching and treating conditions should be adjusted so that a ratio of close to 6 is obtained.

Other methods of mixing the reinforcing materials with the fibrous titanate may be employed. For example, the hydrous oxides may be prepared separately, washed, and then added as a dispersion to the dispersed titanate fibers.

The aluminum metal may be added in different forms, such as in atomized powder state or as flake material, as cut fine wires, or as chopped foil or ribbons.

In some instances recourse to an organic binder is desirable to give the material adequate green strength until it is in place and fired. The binder, if 100% organic, will have no effect on the heat resistance of the fired product.

We claim:

1. A fibrous titanate material selected from the group consisting of sodium and potassium titanates, containing at least .4% by weight, calculated as the oxide, of a cationic multivalent metal compound selected from the group consisting of a titanate, vanadate, silicate, molybdate, zirconate, niobate, aluminate and tungstate, said multivalent metal having an ionic radii of 1.33 A.±.2 A. and being a member of the class consisting of barium, strontium, lanthanum, indium, thallium and bismuth when said material is potassium titanate and having an ionic radii of 0.95 A.±.2 A. and being a member of the class consisting of calcium, yttrium, cadmium, thallium, germanium, lead, mercury, zirconium, hafnium, indium and copper when said material is sodium titanate.

2. A fibrous potassium titanate containing as an essential ingredient from .4 to 10% by weight of a cationic multivalent metal oxide having an ionic radii of 1.33 A.±.2 A. and being a member of the class consisting of barium, strontium, lanthanum, indium, thallium and bismuth and being present as a salt selected from the group consisting of titanates, vanadates, silicates, molybdates, zirconates, niobates, aluminates, and tungstates.

3. A fibrous sodium titanate containing as an essential ingredient from .4 to 10% by weight of a cationic multivalent metal oxide containing compound selected from the group having an ionic radii of .95 A.±.2 A. and being a member of the class consisting of calcium, yttrium, cadmium, thallium, germanium, lead, mercury, zirconium, hafnium, indium and copper and being present as a salt selected from the group consisting of titanates, vanadates, silicates, molydates, zirconates, niobates, aluminates, and tungstates.

4. A fibrous potassium titanate material containing as an essential ingredient barium titanate in an amount equivalent to 0.4 to 10% by weight of barium oxide.

5. A fibrous sodium titanate material containing as an essential ingredient calcium titanate, the latter being present in an amount equivalent to from .5 to 10% by weight of calcium oxide.

6. A fibrous potassium titanate material containing as essential ingredients barium titanate and, as an outer coating, aluminum oxide in an amount equivalent to 0.5 to 10% by weight of barium and aluminum oxides.

7. A fibrous sodium titanate material containing as essential ingredients calcium titanate, and, as an outer coating, alumina, present in an amount equivalent to from 0.5 to 10% by weight of calcium and aluminum oxides.

8. A fibrous potassium titanate material containing as essential ingredients barium titanate and, as an outer coating, zirconia in an amount equivalent to 0.4 to 10% by weight of barium and zirconium oxides.

9. A fibrous potassium titanate material containing as essential ingredients barium titanate and, as an outer coating, titania, the latter being present in an amount equivalent to 0.5 to 10% by weight of barium and titanium oxides.

10. A fibrous potassium titanate composition containing as an essential ingredient 2–6% by weight of barium titanate, calculated as barium oxide.

11. A fibrous sodium titanate composition containing 2–6% by weight of calcium titanate, calculated as calcium oxide.

12. A fibrous alkali metal titanate selected from sodium and potassium titanate containing multivalent metal ions within its crystal lattice in a form of from .5–10% by weight of a multivalent metal oxide selected from the group consisting of cations having ionic radii within 1.3 A.±.2 A. and being a member of the class consisting of barium, strontium, lanthanum, indium, thallium and bismuth when the alkali metal is potassium and cations with ionic radii within .95 A.±.2 A. and being a member of the class consisting of calcium, yttrium, cadmium, thallium, germanium, lead, mercury, zirconium, hafnium, indium and copper when the alkali metal is sodium.

13. A fibrous alkali metal titanate having the formula $M_2O(TiO_2)_n$ where M is a metal selected from the group consisting of sodium and potassium and $n$ is 4–9, said titanate containing as a coating at least .4% of an oxide of a metal having an ionic radii of 1.3 A.±.2 A. and being a member of the class consisting of barium, strontium, lanthanum, indium, thallium and bismuth when said metal is potassium and an ionic radii of .95 A.±.2 A. and being a member of the class consisting of calcium, yttrium, cadmium, thallium, germanium, lead, mercury, zirconium, hafnium, indium and copper when said metal is sodium, together with from .5 to 25% by weight of an oxide of a metal selected from the group consisting of aluminum, titanium, and zirconium.

14. A process for producing a fibrous potassium titanate comprising calcining an intimate mixture of the said titanate and from .4 to 10% by weight of barium oxide and thereafter separating the water soluble products therefrom.

15. A process for producing a fibrous sodium titanate comprising calcining an intimate mixture of the said titanate and from .5 to 10% by weight of calcium oxide and thereafter separating the water soluble products therefrom.

16. A process for producing a fibrous potassium titanate comprising calcining an intimate mixture containing $TiO_2$, a $K_2O$ source, a barium oxide source and KCl for 4 hours at 1000° C.±20° C., separating the water soluble products therefrom, and thereafter treating an aqueous slurry of the washed fibrous material with hydrous alumina in order to produce a filtered and dry product containing from 2–6% barium oxide and from 1.5–2% $Al_2O_3$.

References Cited

UNITED STATES PATENTS

| | | | |
|---|---|---|---|
| 2,833,620 | 5/1958 | Gier et al. | 23—51 |
| 2,841,470 | 7/1958 | Berry | 23—51 |

FOREIGN PATENTS

| | | |
|---|---|---|
| 789,104 | 1/1958 | Great Britain. |

MILTON WEISSMAN, *Primary Examiner.*

OSCAR R. VERTIZ, *Examiner.*

H. T. CARTER, *Assistant Examiner.*